United States Patent [19]

Vos

[11] Patent Number: 5,064,666
[45] Date of Patent: Nov. 12, 1991

[54] APPARATUS FOR FORMING AN INTERIOR CHOCOLATE LAYER ON AN ICE-CREAM CONE

[76] Inventor: Neale Vos, 1599 Castleton Ave., Staten Island, N.Y. 10302

[21] Appl. No.: 490,829

[22] Filed: Mar. 8, 1990

[51] Int. Cl.$^5$ .................... A23G 3/20; A23G 7/02
[52] U.S. Cl. .................... 426/94; 426/95; 426/138; 426/139; 426/279; 426/280; 426/281; 426/283; 426/306; 118/69; 118/18; 118/101; 118/13; 425/138
[58] Field of Search .................... 118/69, 101, 18, 13; 426/94, 95, 138, 139, 249, 281, 279, 280, 283, 306; 425/138

[56] References Cited

U.S. PATENT DOCUMENTS

| | | | |
|---|---|---|---|
| 1,136,074 | 4/1915 | White | 426/279 |
| 2,176,409 | 10/1939 | Peterson | 426/279 |
| 3,274,958 | 9/1966 | Otken | 426/279 |
| 3,770,460 | 11/1973 | Vroman | 426/279 |
| 4,289,791 | 9/1981 | Weinstein | 426/139 |
| 4,390,553 | 6/1983 | Rubenstein et al. | 426/139 |

FOREIGN PATENT DOCUMENTS 0382772 3/1963 Japan .

*Primary Examiner*—Jeanette Hunter
*Attorney, Agent, or Firm*—Milton S. Gerstein

[57] ABSTRACT

An apparatus for forming a layer of chocolate on the interior surface of an ice-cream having a cone-shaped mold that is interiorly-cooled by ice-water provided thereto from a bucket, or other source, of ice-water. For forming an interior chocolate coating, liquid chocolate is placed into the interior of the cone, and the cone is then placed onto the cold mold, and centered thereon by the upper end portion of the mold. The cone is allowed to remain there for a short while, while the cold mold-surface solidifies the liquid chocolate, to thereby form the interior layer of chocolate. A stripping device may, if desired, be employed for aiding in the removal of the thus-coated cone from the mold. In the preferred embodiment, the mold is secured directly to the ice-bucket.

20 Claims, 2 Drawing Sheets

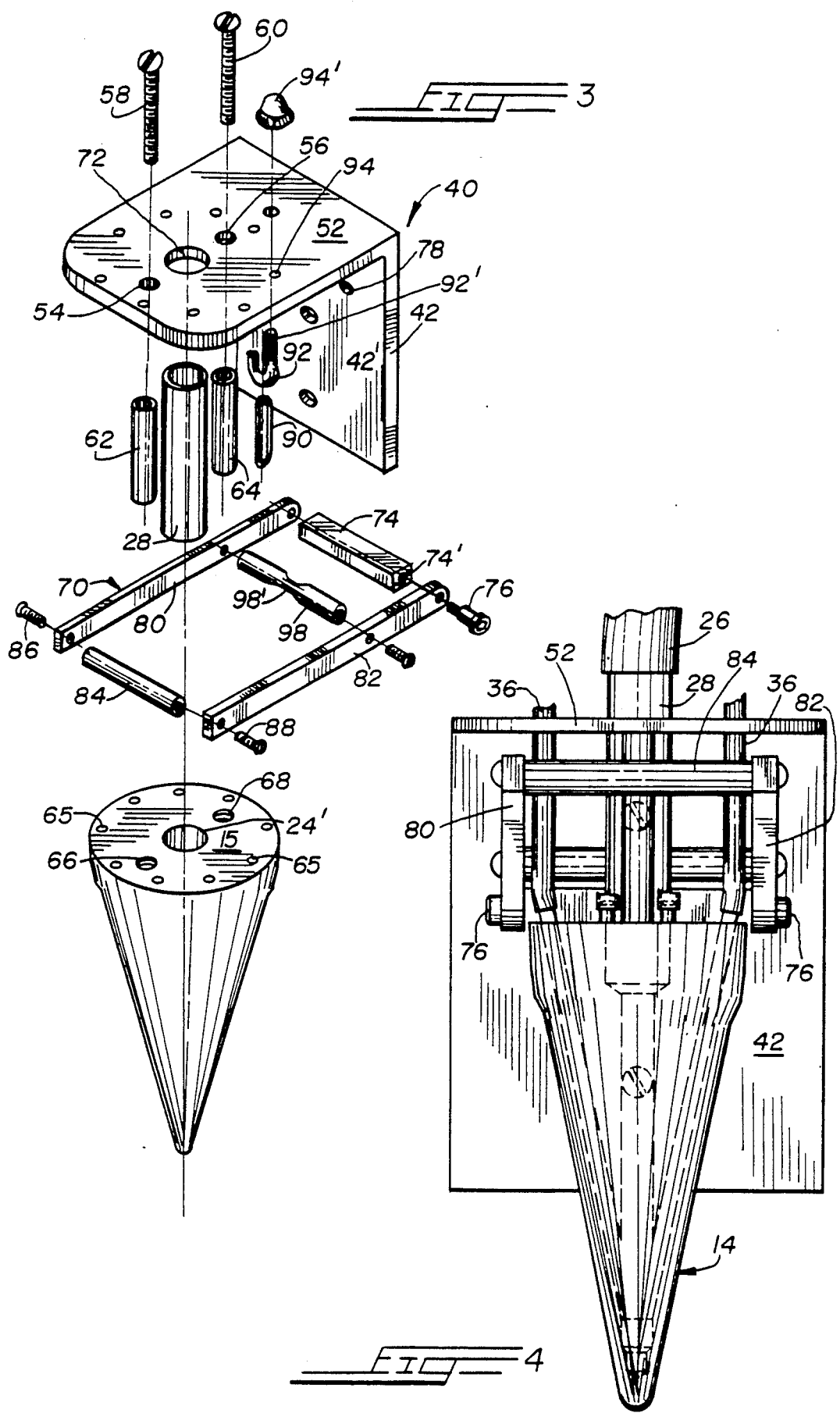

APPARATUS FOR FORMING AN INTERIOR CHOCOLATE LAYER ON AN ICE-CREAM CONE

BACKGROUND OF THE INVENTION

The present invention is directed to an apparatus by which a layer of chocolate may be coated onto the interior surface of an ice-cream cone. It is known to apply a coating of chocolate to the interior surface of an ice-cream cone, but such has hitherto been done without the aid of any device or apparatus, making it difficult, time-consuming, and haphazard, in that chocolate-coated cones may differ markedly from each other. These drawbacks not only cause poor quality control, but have also made it difficult to provide for the production of such chocolate-coated cones in large quantities, such as would be required at commercial establishments, such as ice-cream shops, parlors, stores, and the like.

SUMMARY OF THE INVENTION

It is the primary objective of the present invention to provide an apparatus for coating the interior surfaces of ice-cream cones.

It is another objective of the present invention to provide such an apparatus for coating the interior surfaces of ice-cream cones, such that the coated-cones will be similar, and have a more-even layer of chocolate applied, in a more consistent manner, thereby greatly enhancing quality control.

It is yet another objective of the invention to provide such an apparatus for coating the interior surfaces of ice-cream cones, which is relatively easy to use, and which prevents the liquid chocolate used in the coating process from dripping or escaping outside of the cone during the chocolate-coating process.

It is yet another objective of the invention to provide such an apparatus for coating the interior surfaces of ice-cream cones, which forms the layer or coating of chocolate in a fast manner.

Toward these and other ends, the apparatus for coating the interior surfaces of ice-cream cones comprises a cone-shaped mold that is interiorly-cooled by ice-water provided thereto from a bucket, or other source, of ice-water. The cone-shaped mold has approximately the same sloping surface as that of the cones which are to be coated with chocolate, but has a cross-sectional diameter less than that of the ice-cream cones except for its uppermost end portion, whereby the annular space between the interior surface of the cone and the exterior surface of the mold provides a volume in which the chocolate coating is provided and formed. The uppermost end portion of the mold has the same slope as the remainder of the mold-surface, but of cross-sectional diameter approximately matching that of the upper interior end portion of the ice-cream cone, whereby the ice-cream cone is held on the mold, centered on the uppermost end region of the mold, and whereby the liquid chocolate is prevented from escaping.

For forming an interior chocolate coating, liquid chocolate from a double-boiler is placed into the interior of the cone, in just the right, measured amount for that size of cone, so that when the final solid coating is formed, it will be evenly distributed over the cone interior. After the liquid chocolate is measured and poured into the interior of the cone, the cone is then placed onto the cold mold, and centered thereon by the upper end portion of the mold, and also partially retained thereby. The cone is pushed up the mold by one's hand until the top larger-portion thereof reaches the sloped upper end portion of the cone. The cone is allowed to remain there for a short while, while the cold mold-surface solidifies the liquid chocolate, to thereby form the interior layer of chocolate. A stripping device may, if desired, be employed for aiding in the removal of the thus-coated cone from the mold. In the preferred embodiment, the mold is secured directly to the ice-bucket.

BRIEF DESCRIPTION OF THE DRAWINGS

The invention will be more readily understood with reference to the accompanying drawings, wherein:

FIG. 3 is an assembly view thereof; and

FIG. 4 is a front view thereof.

DETAILED DESCRIPTION OF THE INVENTION

Figure 1:
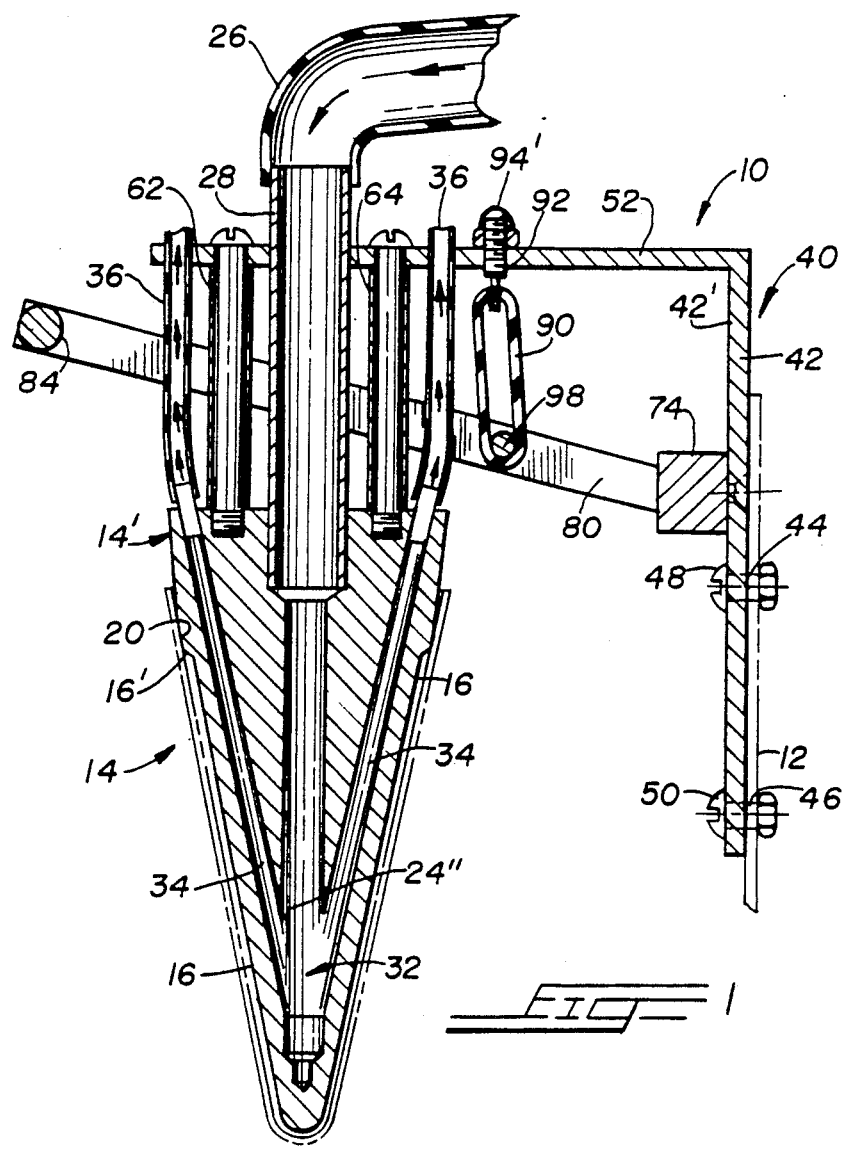
FIG. 1 is a vertical cross-sectional view of the APPARATUS FOR FORMING AN INTERIOR CHOCOLATE LAYER ON AN ICE-CREAM CONE of the invention.

Referring now to the drawings in greater detail, the apparatus for forming an interior layer of chocolate of an ice-cream cone is indicated generally by reference numeral 10. The apparatus 10 includes a bucket 12 filled with ice-water, which ice-water is used for cooling an aluminum mold 14, which mold 14 is used for cooling and solidifying measured melted chocolate poured into the interior surface of an ice-cream, when the ice-cream cone is placed over the mold. The mold 14 has the same general shape as an ice-cream cone, i.e., substantially conical or frustro-conical in shape. The size and dimensions of the conically-shaped mold 14 will depend upon the size and dimensions of the ice-cream cones to be treated. It is, however, within the scope and purview of the invention to allow for the mold to accommodate various sizes of cones, as will be explained, infra. The mold defines an outer tapered surface that is "TEFLON" coated, or the like, to allow for easy removal of the cone after treatment, which outer surface has a slope or taper substantially equal to the interior taper of an ice-cream cone to be treated. Most of the length of the mold, however, has a cross-sectional diameter less than the corresponding diameter-section of the cone placed thereover, so as to leave an annular volumetric space 16 between the outer surface of the mold and the interior surface of the cone, in which space 16 is to be formed the solidified layer of chocolate-coating. The upper end-portion 14' of the mold 14 is provided with a larger-diameter cross section 20, which defines an outer tapered surface also of the same slope as that of the conical ice-cream cone and the same as the rest of the outer surface of the mold. This tapered section 20 defines at least along one diametric portion thereof having a cross-sectional diameter approximately equal to the cross-sectional diameter of the upper interior portion of the ice-cream cone, so that the ice-cream cone may be held on this tapered section 20, while also being centered thereby, so that the annular volumetric space 16 has the same width, as defined between the outer surface of the mold and the inner surface of the cone, all around it, so that the layer of chocolate coating is as uniformly as possible distributed about the interior surface of the cone, with approximately the same thickness thereof about the entire 360 degrees of the interior surface of the cone. The length of the centering strip as measured from top to bottom, may be between ⅛ inch and ¼ inch, so that approximately the same length of the upper interior portion of a cone is in surface-to-surface contact therewith, for holding and centering the cone, as explained, supra. This centering section 20 also serves to prevent the melted chocolate from rising out of the interior of the cone and spilling outwardly therefrom. There is a transitional connecting surface 16' between the upper, centering section 20 and the remainder of the outer surface of the mold.

The use of the tapered centering section 20, as explained, provides for a more uniform chocolate coating, by centering the cone. It is, however, within the scope and purview of the invention, to provide a conically-shaped mold that has a length or height from top to bottom that will accommodate the longest of ice-cream cones to be treated, while also being able to treat smaller cones, owing to the conical taper thereof. For smaller cones, the bottom apex will limit the telescoping mounting of the cone about lower portions of the mold, if smaller cone has a taper greater than that of the mold's outer surface. Otherwise, the small cone's movement over the mold's outer surface will be limited by the cross section of the mold having the same diametric extent as the upper end of the ice-cream cone. The centering strip 20 may be still provided for use with the largest cone to be treated, with the smaller cones not having as uniform a chocolate-coating, absent the centering function of a centering annular strip. In the case of a small cone having a taper greater than that of the mold, where the bottom apex thereof limits its telescoping movement, less than the full measured amount of melted chocolate may have to be used in order to prevent the outward spillage from the interior of the cone during treatment.

Figure 2:
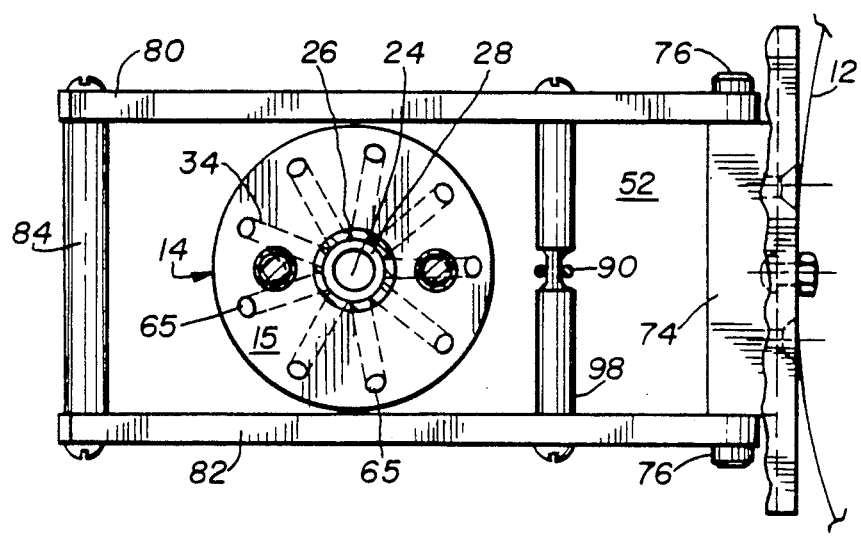
FIG. 2 is a top view thereof.

As explained above, the mold is brought to a cold temperature in order to solidify the melted chocolate placed in the interior of the ice-cream cone. The melted chocolate is supplied from a double-boiler, and poured into the interior of an ice-cream cone by means of a measuring scoop, which scoop provides the same amount to each similar-sized cone, and which measured amount is that which allows for coating on the interior surface of the cone, without excess, so as to prevent spillage and an uneven coating. The mold is preferably held at a temperature close to 32 degrees F., and is achieved by pumping ice-water from the ice-bucket 12 through the interior of the mold 14 and out again for return back to the ice-bucket for re-cooling. The mold 14 is provided with a ¼ inch, vertical central passageway 24 extending most of the length, or depth, of the mold 14, which central passageway receives a supply of pumped ice-water from the ice-bucket 12 via a ½ inner diameter rubber tube or conduit 26. An aluminum connecting cylindrical pipe or tube 28, preferably ½ inch in outer diameter, has an upper end for telescopingly mounting the end of the supply conduit 26, the lower end of the tube 28 being received in an enlarged upper portion 24' (FIG. 3) of the central passageway 24 for nestled seating therein, which nestled seating is provided by the truncated-conical shape of the bottom of the upper opening 24', as clearly shown in FIG. 1. The length, or depth, of the upper opening 24' is such as to prevent the tube 28 from tipping over. In fluid communication with the bottom 24'' is a manifold portion 32, formed at the lower or bottom apex of the mold 14, with which nine smaller vertically-sloping return-passageways 34 are in fluid communication, so that the supply-water through the central passageway 24 may be returned to the ice bucket via these nine return-passageways 34, by nine rubber return-tubes 36 of ⅛ inch inner diameter. The nine return-passageways 34 are arranged concentrically about the central passageway 24, as seen in FIG. 2, where the upper ends of these return-passageways form a circle about the central opening. Each return-passageway 34 has a lower end sloping inwardly from its upper end, and ending in the lower manifold portion 32. The distal ends of the nine rubber return-tubes 36 are placed in the ice-bucket so that the water may be returned to the ice-bucket for re-cooling, where the same water is recycled. The return-passageways 34 are placed as close as possible to the outer surface of the mold 14, so as to provide the most effective cooling thereof. The manifold portion 32 is of such depth so as to allow for the proper circulation and flow of the water-supply, in order to provide sufficient cooling action.

In the preferred embodiment, the mold 14 is secured directly to the outer wall of the ice-bucket, via an L-shaped bracket 40. The bracket 40 has a first, vertical, flat-plate leg-portion 42 defining a pair of vertically-aligned holes 44, 46, by which screws 48, 50 may secure the bracket 40 to the ice-bucket, and a second, flat-plate horizontal leg-portion 52 for directly mounting the mold thereto. The upper, horizontal leg-portion 52 has a pair of holes 54, 56 by which the mold is secured thereto by elongated screws 58, 60, telescopingly received in a pair of steel spacers 62, 64. The threaded tip-ends of the two screws 58, 60 are received in a pair of threaded holes 66, 68 formed in the upper surface 15 of the mold 14, with the mold proper being spaced vertically downwardly from the upper horizontal leg portion 52 of the bracket 40 by the spacer-sleeves 62, 64, so as to provide a gap or space between the leg-portion 52 and the upper surface 15 of the mold, in which space is pivotal a stripper-member 70 for aiding in the removal of the coated cone from its contact with the mold surface, after the chocolate layer-coating has been solidified. In a version of the invention where no stripper-member 70 is provided, then the spacer-sleeves 62, 64 would not be needed, and the upper surface 15 of the mold 14 may directly abut, or be in close proximity to the undersurface of the upper leg-portion 52. In either version, this upper leg-portion is provided with an enlarged circular opening 72 through which passes the upper part of the aluminum feed-pipe 28, for susbequent coupling to the plastic feed-conduit 26, and is also provided with a circular array of nine arcuatly-spaced smaller circular holes 65 through which pass respective ones of the nine plastic return-tubes 36 for subsequent placement of their distal ends in the ice-bucket. It is, of course, to be understood that the number of such return-tubes 36, and associated return-passageways 34 may vary depending the diametric size thereof, size of the mold, temperature of the water, and the like.

The stripper member 70 is pivotally mounted at one end thereof to the mold-facing surface 42' of the first leg-portion 42 by a pivot-block 74 having a transverse axial opening 74', best seen in FIG. 3, for receiving two pivot shaft pins 76 at each end thereof, for rotatably mounting the stripper element's side frame bars 80, 82 for rotation about the pivot block, as clearly shown in FIG. 3, for rotation in a vertical direction. The pivot block 74 may be secured to the interior face 42' by threaded holes 78 and screws passing therethrough and into the block proper. The pair of side frame bars 80, 82 have holes at the inner ends for passing therethrough the pivot pins for rotation thereabout. The perpendicular distance between the interior, mutually-facing surfaces of the two side frame bar members 80, 82 is slightly greater than the circular diameter of the upper portion of the mold, so that as the stripper element is rotated downwardly, the bottom surfaces of the two side frame bars may clear the upper centering strip 20, and push the upper edge surface of the ice-cream cone off the centering strip and thereby cause the chocolate-coated cone off the mold. The stripper element may not be needed in an embodiment where the "TEFLON" coating provides a smooth enough surface where there is no worry of the cone sticking to the mold surface. This distance between the two side frame bars also, of course, allows clearance of the return tubes 36, when the stripper element is pivoted vertically. The lengths of the side frame bars 80, 82 are also enough so as to clear the upper portion of the mold, the exterior or distal ends of which side bar elements are interconnected by a handle-element 84, by screws 86, 88, so as to provide a handle by which a person may manually rotate the stripper element. The stripper element is biassed in the upward direction by a rubber band 90, or the like, one end-loop of which is constrained by a hook-element 92 having a threaded shaft 92' passing through a hole 94 formed in the horizontal leg portion 52, and secured by a nut 94'. The lower end-loop of the rubber band 90 is wrapped about an intermediate shaft 98 spanning the distance between the two side frame bar elements 80, 82, which shaft 98 has a central dimple or reduced-diameter section 98' at which section the lower end-loop is actually encircled, to help prevent its slippage or sliding along the shaft 98. In using the stripper element, one merely rotates it downwardly against the force of the rubber band, until it contacts the upper edge surface of the cone, with continued downward movement thereof causing the cone to slide off the mold. Releasing the handle 84 thereof causes the stripper element to return, via the rubber band, to its neutral position above the mold.

While a specific embodiment of the invention has been shown and described, it is to be understood that numerous changes and modifications may be made therein without departing from the scope, spirit and intent of the invention as set forth in the appended claims.

What I claim is:

1. An apparatus for forming a coating of chocolate on the interior surface of an ice-cream cone, comprising:
   a substantially solid mold having an outer cone-like surface for receiving thereover an ice-cream cone, such that the interior surface of the ice-cream cone surrounds said outer cone-like surface of said mold; and
   means for cooling said outer cone-like surface of said mold, whereby melted chocolate contained in the interior of an ice-cream cone placed over said outer cone-like surface may be cooled and solidified to form an interior coating on the ice-cream cone;
   said means for cooling comprising a supply of cold water, and means for supplying said cold water to said mold, said mold comprising water-passageway means for receiving said cold water therein and for directing said cold water back toward said supply, whereby said cold water cools said outer surface to a temperature capable of solidifying melted chocolate.

2. The apparatus according to claim 1, wherein said supply of cold water comprises a bucket filled with ice-water; said means for supplying said cold water comprising a first inlet-conduit, and at least one second outlet-conduit; said water passageway means of said mold comprising a first inlet-passageway for receiving the supply of cold water from said first inlet-conduit, and a second outlet-passageway for directing said cold water to said second outlet-passageway; said first and second passageways being in fluid communication with each other so that said cold water flows from said first passageway and thereafter to said second passageway for return to said ice-bucket.

3. The apparatus according to claim 1, wherein said means for supplying said cold water comprises a first inlet-conduit, and at least one second outlet-conduit; said water passageway means of said mold comprising a first inlet-passageway for receiving the supply of cold water from said first inlet-conduit, and a second outlet-passageway for directing said cold water to said second outlet-passageway; said first and second passageways being in fluid communication with each other so that said cold water flows from said first passageway and thereafter to said second passageway.

4. The apparatus according to claim 3, wherein said passageway means of said mold also comprises a manifold, each of said first and second passgeways having a lower end in fluid communication with said manifold.

5. The apparatus according to claim 4, wherein said first passageway is substantially vertically and centrally positioned in said mold, and said at least one second passageway is positioned radially outwardly of said first passageway and inclines upwardly away from said first passageway from the lower ends thereof in fluid communication with said manifold.

6. The apparatus according to claim 1, wherein said outer surface of said mold comprises an upper centering member for entering into the upper interior portion of an ice-cream cone for centering the ice-cream cone about said outer surface.

7. The apparatus according to claim 6, in combination with an ice-cream cone having an interior surface and an exterior surface, said cone being placed over said outer surface of said mold, wherein said centering member comprises an annular ring member defining an outer sloped annular surface, at least one horizontal cross-sectional portion of which has an outer diameter substantially equal to the inner diameter of an upper interior horizontal cross-section of said ice-cream cone, whereby said interior surface of the cone is spaced equidistantly from said outer cone-shaped surface of the said mold about the entire periphery thereof and along the length thereof.

8. The apparatus according to claim 7, wherein said outer cone-shaped surface of said mold defines an angle of slope approximately equal to that of said ice-cream cone placed thereover.

9. The apparatus according to claim 8, wherein said outer surface of said mold has a horizontal cross-sectional diameter along the length thereof below said centering member less than the corresponding, horizontal cross-sectional portions of said ice-cream cone placed thereover, so as to provide an annular gap between said interior surface of the cone and said outer surface of said mold along the length of said mold from beneath said centering member and therebelow.

10. The apparatus according to claim 7, wherein said slope of said outer surface of said centering member is approximately equal to the slope of said outer surface of said mold.

11. The apparatus according to claim 1, further comprising means for mounting said mold directly to said supply of cold water.

12. The apparatus according to claim 11, wherein said means for mounting comprises a bracket element having a first vertical leg-portion directly attached to said supply means, and a second horizontal leg-portion extending from said first leg-portion, to which is secured said mold.

13. The apparatus according to claim 12, wherein said means for mounting further comprises means for securing said mold to said second leg-portion, said means for securing spacing the upper surface face of said mold away from the lower face of said second leg-portion; said apparatus further comprising a stripper means for stripping an ice-cream cone from its telescoping contact about said outer surface of said mold after the melted chocolate has been solidified and formed into an interior coating on the cone, said stripper means being movable in said spacing between said upper surface of said mold and said lower face of said second leg-portion.

14. The apparatus according to claim 13, wherein said stripper means comprises a pair of side frame elements having interior, mutually facing surfaces spaced apart a distance greater than the diametric extension of the upper portion of the mold for the clearing thereof when pivoted therepast, means for pivotally mounting one end of each said side frame element; said distance being less than the diametric extent of the uppermost portion of an ice-cream placed over the mold for pushing the ice-cream cone off the mold after the interior layer of chocolate has been formed.

15. An apparatus for forming a coating of chocolate on the interior surface of an ice-cream cone, comprising:
   a mold having an outer cone-like surface for receiving thereover an ice-cream cone, such that the interior surface of the ice-cream cone surrounds said outer cone-like surface of said mold; and
   means for cooling said outer cone-like surface of said mold, whereby melted chocolate contained in the interior of an ice-cream cone placed over said outer cone-like surface may be cooled and solidified to form an interior coating on the ice-cream cone;
   said outer surface of said mold comprising an upper centering member for entering into the upper interior portion of an ice-cream cone for centering the ice-cream cone about said outer surface.

16. The apparatus according to claim 15, in combination with an ice-cream cone having an interior surface and an exterior surface, said cone being placed over said outer surface of said mold, wherein said centering member comprises an annular ring member defining an outer sloped annular surface, at least one horizontal cross-sectional portion of which has an outer diameter substantially equal to the inner diameter of an upper interior horizontal cross-section of said ice-cream cone, whereby said interior surface of the cone is spaced equidistantly from said outer cone-shaped surface of the said mold about the entire periphery thereof and along the length thereof; said outer cone-shaped surface of said mold defining an angle of slope approximately equal to that of said ice-cream cone placed thereover; said outer surface of said mold having a horizontal cross-sectional diameter along the length thereof below said centering member less than the corresponding, horizontal cross-sectional portions of said ice-cream cone placed thereover, so as to provide an annular gap between said interior surface of the cone and said outer surface of said mold along the length of said mold from beneath said centering member and therebelow.

17. An apparatus for forming a coating of chocolate on the interior surface of an ice-cream cone, comprising:
   a mold having an outer cone-like surface for receiving thereover an ice-cream cone, such that the interior surface of the ice-cream cone surrounds said outer cone-like surface of said mold;
   means for cooling said outer cone-like surface of said mold, whereby melted chocolate contained in the interior of an ice-cream cone placed over said outer cone-like surface may be cooled and solidified to form an interior coating on the ice-cream cone; and
   stripper means operatively coupled with said mold for stripping an ice-cream cone from its telescoping contact about said outer surface of said mold after the melted chocolate has been solidified and formed into an interior coating on the cone, said stripper means being movable over at least a portion of the length of at least part of said outer surface of said mold.

18. The apparatus according to claim 17, wherein said means for cooling comprises a supply of cold water, and further comprises means for mounting said mold directly to said supply of cold water said means for mounting comprising a bracket element having a first vertical leg-portion directly attached to said supply of cold water, and a second horizontal leg-portion extending from said first leg-portion, to which is secured said mold.

19. The apparatus according to claim 18, wherein said means for mounting further comprises means for securing said mold to said second leg-portion, said means for securing spacing the upper surface face of said mold away from the lower face of said second leg-portion; said stripper means for stripping an ice-cream cone from its telescoping contact about said outer surface of said mold after the melted chocolate has been solidified and formed into an interior coating on the cone being movable in said spacing between said upper surface of said mold and said lower face of said second leg-portion.

20. The apparatus according to claim 17, wherein said stripper means comprises a pair of side frame elements having interior, mutually facing surfaces spaced apart a distance greater than the diametric extension of the upper portion of said mold for the clearing thereof when pivoted therepast, means for pivotally mounting one end of each said side frame element; said distance being less than the diametric extent of the uppermost portion of an ice-cream placed over the mold for pushing the ice-cream cone off the mold after the interior layer of chocolate has been formed.

* * * * *